United States Patent [19]

Yamada et al.

[11] Patent Number: 5,675,893
[45] Date of Patent: Oct. 14, 1997

[54] METHOD FOR FASTENING AN ENGAGING MEMBER TO A CYLINDER

[75] Inventors: Yusuke Yamada, Kawasaki; Toshie Kaneko, Yokohama; Shigemori Tanaka, Kawasaki, all of Japan

[73] Assignee: Canon Kabushiki Kaisha, Tokyo, Japan

[21] Appl. No.: 709,627

[22] Filed: Sep. 9, 1996

Related U.S. Application Data

[63] Continuation of Ser. No. 125,858, Sep. 24, 1993, abandoned.

[30] Foreign Application Priority Data

Sep. 24, 1992 [JP] Japan .................. 4-277693
Dec. 28, 1992 [JP] Japan .................. 4-347418
Sep. 10, 1993 [JP] Japan .................. 5-225858

[51] Int. Cl.⁶ .................................... B23P 15/00
[52] U.S. Cl. .............. 29/895.22; 29/895.2; 29/895.23
[58] Field of Search .................. 29/895.62, 516, 29/895.2, 895.63, 422, 509, 513, 515; 355/210; 492/45, 47

[56] References Cited

U.S. PATENT DOCUMENTS

| | | |
|---|---|---|
| 1,092,464 | 4/1914 | Watson et al. |
| 2,160,598 | 5/1939 | Melrath et al. ............... 29/513 |
| 2,429,293 | 10/1947 | Peck et al. .............. 29/895.22 |
| 4,344,218 | 8/1982 | Hooper et al. ............. 29/516 |
| 4,575,221 | 3/1986 | Onoda et al. .............. 355/71 |
| 4,829,335 | 5/1989 | Kanemitsu et al. ......... 355/211 |
| 4,940,937 | 7/1990 | Hattori et al. ............. 29/513 |
| 5,158,328 | 10/1992 | Anderson et al. ........... 29/513 |
| 5,163,224 | 11/1992 | Wells et al. ................ 29/513 |
| 5,189,779 | 3/1993 | Fishel et al. ............... 29/513 |

FOREIGN PATENT DOCUMENTS 57-66455  4/1982  Japan .

*Primary Examiner*—Irene Cuda
*Attorney, Agent, or Firm*—Fitzpatrick, Cella, Harper & Scinto

[57] ABSTRACT

A method for forming a cylindrical structure by fastening an engaging member to an open end of a cylinder, including the steps of preparing an inner surface at the open end of the cylinder to provide the cylinder with a reduced thickness, providing an engaging member having a plurality of discrete recesses formed circumferentially around the periphery of the engaging member, and fitting the engaging member into the processed open end of the cylinder. The invention further comprises bending and cutting the processed open end of the cylinder around the open end of the cylinder such that plural projections project into the recesses of the engaging member. In this manner the engaging member is restricted from relative movement between the cylinder and the engaging member in both the longitudinal and rotational directions.

52 Claims, 8 Drawing Sheets

METHOD FOR FASTENING AN ENGAGING MEMBER TO A CYLINDER

This application is a continuation application of application Ser. No. 08/125,858, filed Sep. 24, 1993, now abandoned.

FIELD OF THE INVENTION AND RELATED ART

The present invention relates to a method of fastening an engaging member to an end of a cylinder, a cylindrical structure thus formed, a process cartridge and an image forming apparatus including the cylindrical structure.

Herein, the image forming apparatus may for example include a laser beam printer, an electrophotographic copying machine, a facsimile apparatus and a word processor. The cylindrical structure may for example include a photosensitive drum, a conveying roller, a fixing roller and a developing sleeve for such image forming apparatus.

Hereinbelow, the description will be made principally based on production of a photosensitive drum as an example of the cylindrical structure. It is however to be understood the present invention is not restricted thereto but can be widely applicable to production of apparatus for forming images on recording media and parts thereof.

Hitherto, a cylindrical electrophotographic photosensitive member (hereinafter sometimes called a "photosensitive drum") has been formed by providing both ends of a cylinder having a peripheral surface coated with a photoconductive substance with a terminal engaging member, such as a drum flange or drum gear for rotating the photosensitive drum (hereinafter simply called a "flange" or "gear") engaged with the ends by bonding with an adhesive or by force fitting under an external pressure.

The engagement by bonding has been effected by applying an appropriate amount of adhesive onto a part of the gear or flange to be inserted into the cylinder and, after the fitting, causing the adhesive to be completely cured while keeping the fitted members in a place (environment) not affected by a change in temperature or humidity. For the adhesive, an instant adhesive, and an adhesive primer together with an anaerobic adhesive, etc., have been generally used selectively in view of the usage, purpose, required strength, etc.

It is a recent trend that the gear or flange is formed integrally by injection molding of a plastic resin in view of the lightness, productivity and production cost, and various plastic resins are used in consideration of adhesion with the inner surface of the cylinder, the gear strength given thereby and the friction or rubbing characteristic with respect to the material constituting the mating gear. Further, regarding the shape of the gear or flange gear, a helical gear has also been adopted as disclosed in U.S. Pat. No. 4,829,335 in addition to an ordinary spur gear.

A photosensitive drum in an electrophotographic image forming apparatus is generally supported by a position-determining member of the apparatus main body, but it is necessary to provide a slight clearance or allowance between the main body and the photosensitive drum. Accordingly, in case where the gear is a spur gear, the photosensitive drum under rotation can cause a positional deviation in the axial direction so that it is liable to fail in providing good quality of images due to a positional deviation of the photosensitive drum during image formation. In contrast thereto, if the gear is constituted as a helical gear, the drum gear under rotation is supplied with a thrust in the axial direction so that the photosensitive drum is always pushed against a constant side and an unstable positional deviation of the photosensitive drum is obviated.

However, several difficulties as mentioned below have been encountered with respect to conventional photosensitive drums as described above.

(1) In the case of a helical gear, an axial thrust is exerted upon a photosensitive drum under rotation. Accordingly, the helical gear is supplied with an impacting load in the thrust direction, so that the connection between the drum and the helical gear should be formed as durable against such repetitive impacting load. This has provided several constraints on the selection of adhesives or conditions for force fitting, and the constraints have resulted in complication of the assembling step and increased production cost.

(2) In case where the bonding and curing are effected in a high temperature—high humidity environment (e.g., temperature: 32.5° C. relative humidity: 85%), moisture in the atmosphere adversely affects the bonding surface to result in a low torque strength.

(3) Very long time is required until the complete curing of an adhesive depending on the kind of the adhesive used, so that a large space is required for the storage during the curing time and a facility for keeping the temperature and humidity of the storage is also required. Thus, several inconveniences are encountered also in respects of cost, management end productivity.

(4) In order to obtain a high bonding strength, materials of gear and flanges are restricted.

(5) In case where an electrical continuity with an apparatus body is taken by providing the gear or flange end with an electrode plate contacting the inner surface of the cylinder, flagging or flowing the adhesive can occur before the complete curing to cause a conduction failure between the electrode plate and the inner surface of the cylinder.

SUMMARY OF THE INVENTION

An object of the present invention is to provide a method of fastening an engaging member to an end of a cylinder to provide a sufficient fastening or engaging force.

Another object of the present invention is to provide a fastening method capable of providing a secure fastening between a cylinder and an engaging member under variable environmental conditions.

A further object of the present invention is to provide a fastening method capable of providing further improved quality of images.

Another object of the present invention is to provide a fastening method affording a much improved productivity.

A further object of the present invention is to provide a fastening method capable of realizing a joint with a high accuracy.

According to the present invention, there is provided a method of fastening an engaging member to an end of a cylinder, comprising:

processing an inner surface of the cylinder to provide the cylinder with a reduced thickness providing an engaging member having a plurality of discrete recesses formed circumferentially around the periphery of the engaging member, fitting the engaging member into the processed open end of the cylinder and bending and cutting the processed open end of the cylinder at the positions spaced circumferentially around the open end of the cylinder, such that plural parts projected to the recess of the engaging member thereby restricting relative movement between the cylinder and the engaging member in longitudinal and rotational directions.

According to another aspect of the present invention, there is provided a method of assembling a drum equipped with a helical gear comprising:

providing a cylinder having an outer surface coated with an image-bearing layer, providing a helical gear having a head to be inserted into an end of the cylinder and a plurality of recesses adjacent to the head, fitting the helical gear to at least one end of the cylinder, and bending and cutting the cylinder, at plural parts thereof, into the recesses of the helical gear, thereby fastening the helical gear to at least one end of the cylinder.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
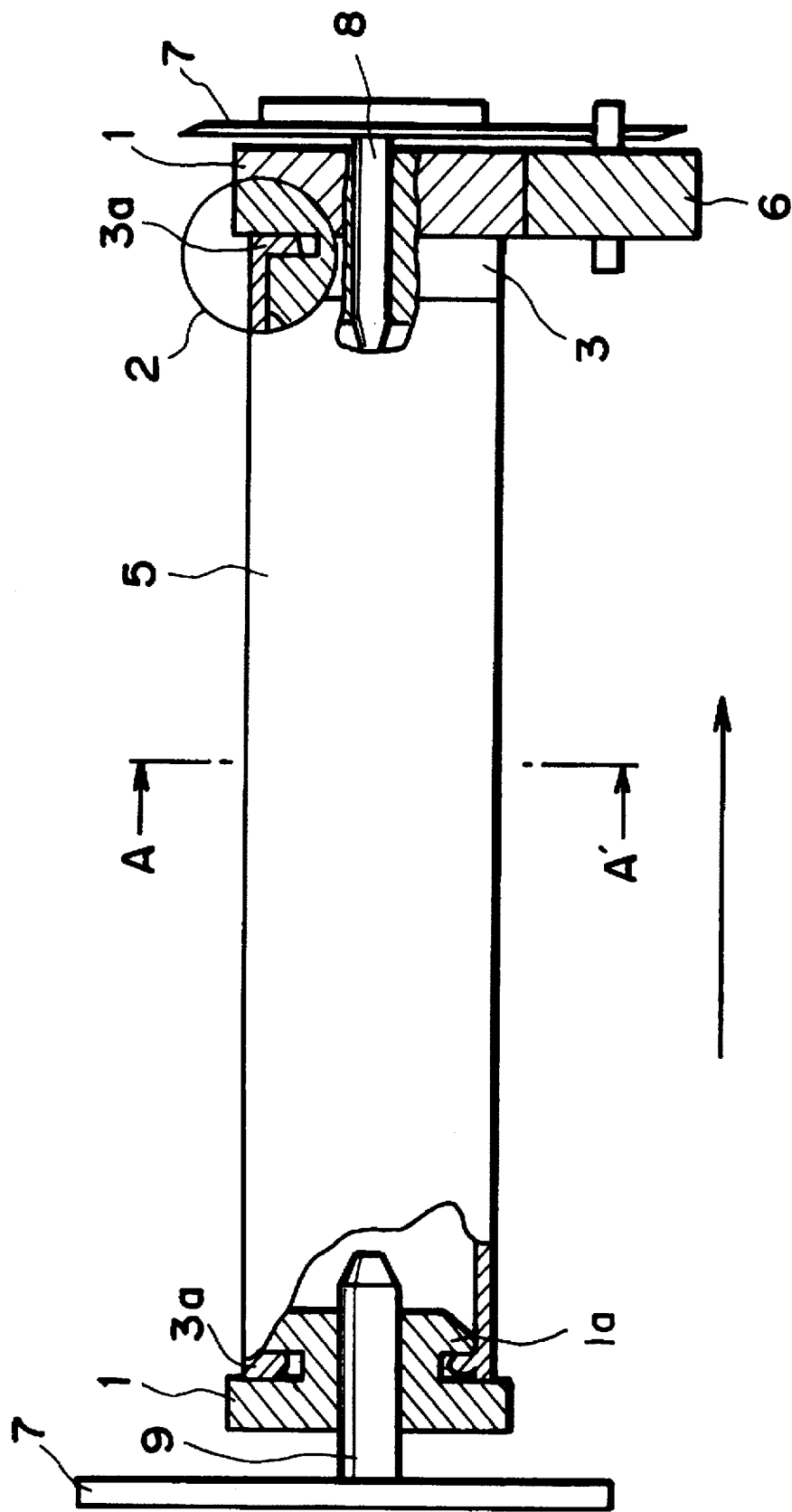
FIG. 1 is a sectional view of a photosensitive drum according to an embodiment of the present invention.

A preferred embodiment for fastening an engaging member to an end of a cylinder according to the present invention will now be described.

The cylinder may preferably have an end brim section having a thickness of 0.3–1.5 mm, particularly 0.5–1.5 mm.

The cut length of the end brim during the bending and cutting step may preferably be at least 0.2 mm, particularly at least 0.25 mm. This point will be explained in further detail hereinafter.

The cylindrical structure according to the present invention may effectively be used as various image bearing members inclusive of a photosensitive drum, first of all, and also as various roller members such as a platen roller, a conveying roller, a developing sleeve, a fixing roller and a printing plate roller, to which a driving force is transmitted and which therefore require a strong engagement between a cylinder and a terminal engaging member constituting the same.

The photosensitive drum, i.e., a photosensitive member in a cylindrical form, for electrophotography may take various forms so as to attain desired characteristics or depending on the kinds of electrophotographic processes applied thereto. Representative photosensitive members for electrophotography may include a photosensitive drum comprising a photoconductive layer formed on a cylindrical support and a photosensitive drum further including a surface protective layer thereon which have been widely used. The photosensitive drum comprising a cylindrical support and a photoconductive layer may be used for image formation by the most popular electrophotographic process including charging, imagewise exposure, development and further transfer as desired. As for the photosensitive drum provided with a protective layer, such a protective layer may be provided for the purpose of, e.g., protecting the photoconductive layer, improving the mechanical strength of the photosensitive member, improving the dark decay characteristic, or providing a characteristic suited for a certain electrophotographic process.

Some other representative image forming processes, in which cylindrical image-bearing members may be used, are described below.

(1) In order to improve the repetitive usability of an electrophotographic photosensitive member, an electrostatic image formed on the electrophotographic photosensitive member is transferred to another image-bearing member for development, and the resultant toner image is transferred to a recording member. (2) In another electrophotographic process involving forming an electrostatic image on another image-bearing member corresponding to an electrostatic image formed on an electrophotographic photosensitive member, an electrostatic image is formed on an electrophotographic photosensitive member in the form of a screen having a large number of minute openings through a prescribed electrophotographic process, a corona charging treatment is applied to another image-bearing member by the medium of the electrostatic image to modulate the corona ion stream thereby forming an electrostatic image on the above-mentioned another image-bearing member, and the electrostatic image is developed with a toner and transferred to a recording member to form a final image. (3) According to another electro-photographic process, a toner image formed on an electrophotographic photosensitive member or another image-bearing member is not directly transferred to a recording member but is once transferred to still another image-bearing member, and the toner image is then transferred to a recording member to be fixed thereon. This process is particularly effective for production of color images and high-speed copying. The recording member may ordinarily be a flexible material, such as paper or film. Accordingly, rather than transferring three color images to a recording member with precise positional alignment, a more accurately aligned color image can be formed if three color images are transferred onto an image-bearing member composed of a material substantially free from deformation and then transferred to a recording member at a time. Further, the transfer of a toner image to a recording member by the medium of an image-bearing member is also effective for high-speed copying. (4) In another process, an electric signal is applied to a multi-stylus electrode to form an electrostatic image on an image-bearing member corresponding to the electric signal, and the electrostatic image is developed to provide an image.

The image-bearing members used in electrostatic image-forming process like those of (1)-(4) above do not require a photoconductive layer.

Thus, cylindrical image-bearing members on which electrostatic images or toner images are formed may comprise various members which may generally have an insulating layer as the surface layer, including as a representative example an electrophotographic photosensitive member having a surface layer which may be a protective layer or a photoconductive layer.

The cylindrical structure according to the present invention may for example be prepared in the following manner. A head (i.e., a part to be inserted into a cylinder) of a terminal engaging member is inserted into a cylinder of, e.g., aluminum, copper or stainless steel. Adjacent the head is disposed a recess toward the inside or axis of the terminal engaging member. The recess may have an appropriate shape (inclusive of width, length and depth). To an end brim part covering the recess of the cylinder, a generally claw- or wedge-shaped thrusting member having a tip forming an acute angle and having a width almost identical to the recess is abutted and pushed toward the inside of the recess in a certain amount of penetration, whereby the cylinder end brim is bent and sheared almost simultaneously in a shape conforming with the recess. The sheared part of the bent and cut end brim is intimately attached to and fitted with the recess contour, and the bent and cut part (particularly the inner surface thereof) of the end brim is intimately attached to the side and bottom of the recess, whereby a reliable fastening is secured.

Hereinbelow, the present invention will be explained based on an embodiment wherein the cylindrical structure is constituted as a photosensitive drum with reference to drawings. FIG. 1 is a sectional view of a photosensitive drum according to an embodiment of the present invention Referring to FIG. 1, the photosensitive drum includes a terminal engaging member 1, in the form of a helical gear or a flange equipped with a helical gear, which is engaged with the ends of the photosensitive drum for rotatably supporting the photosensitive drum and provided with recesses 2, and a cylinder (cylindrical substrate) 3 of aluminum alloy surface-coated with a photoconductive layer 5 of a photosensitive material. The cylinder 3 is fitted about the gear or flange 1 with a certain fitting allowance and engaged with the gear or flange 1 at the recesses 2. The gear or flange 1 may be regarded as comprising a head (part to be inserted into the cylinder) 1a, a base 1b and recesses 2 formed between the head 1a and the base 1b. The helical gear 1 is rotated about a drum axis 9 by being engaged with a helical gear 6 driven by a motor (not shown) of the image forming apparatus main body for driving the drum supported by a drum-supporting and position-determining pin 8 fixed to a side wall 7 of the apparatus main body 100. Incidentally, the flange equipped with a helical gear may comprise an insulating plastic.

Referring to FIG. 1, when the drum-driving gear 6 is driven, a thrust for moving the drum cylinder 3 rightward (in the direction of an arrow) and the drum cylinder 3 is moved rightward. As a result, the end face of the helical gear 1 is abutted against the side wall 7 constituting a standard surface of the main body, so that the drum cylinder 3 and thus the photosensitive drum) is always held at its normal position.

Incidentally, in case where the drum cylinder 3 has an outer diameter of about 25–40 mm, it has been experimentally found optimum that the drum gear 1 has a helical Sear with a module of around 0.8 and a twist angle of around 10–20 degrees in view of a relationship between the thrust and the degree of rubbing between the drum gear 1 and the side wall 7. In a specific example, the drum cylinder outer diameter was 30 mm, and the drum gear was designed to have a module of 0.8 and a rightward twist angle of 10 degrees. Another suitable combination may include a cylinder outer diameter of 24 mm and a drum gear 1 having a module of 0.8 and a leftward twist angle of 16 degrees, or a drum cylinder outer diameter of 30 mm and a drum gear 1 having a module of 0.9 and a leftward twist angle of 20 degrees.

Figure 2:
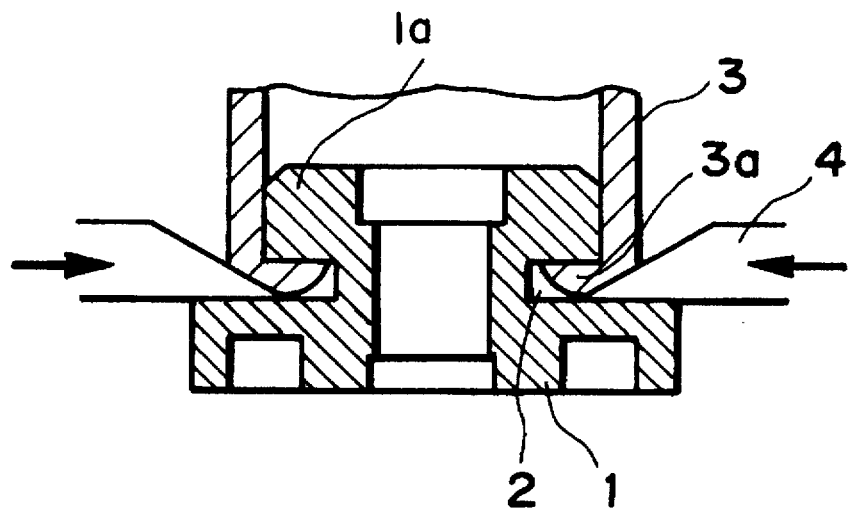
FIG. 2 is a sectional illustration of a bending and cutting step.
Figure 3:
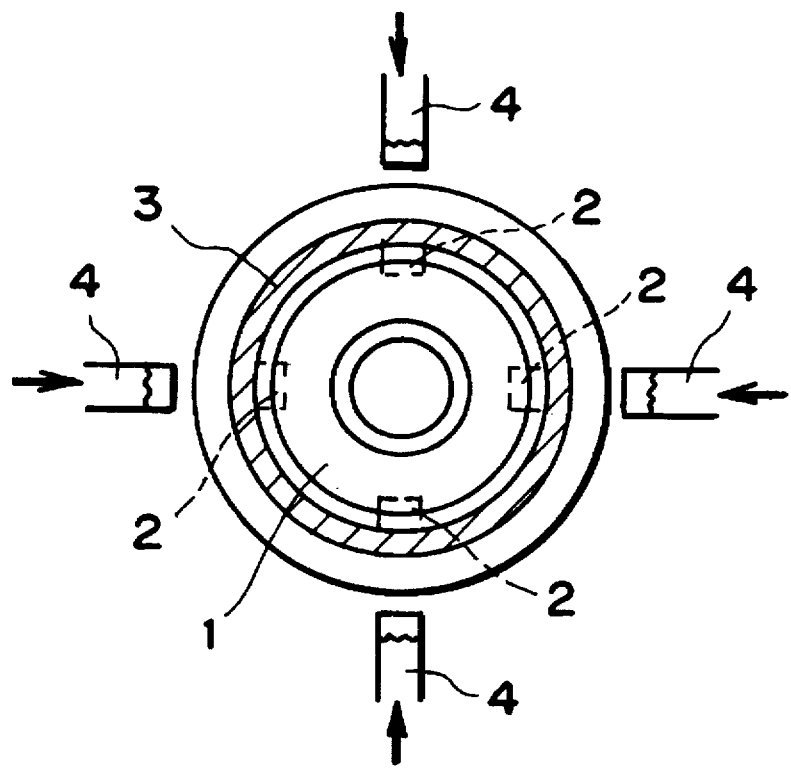
FIG. 3 is a corresponding top plan view, according to an embodiment of the invention.
Figure 4A:
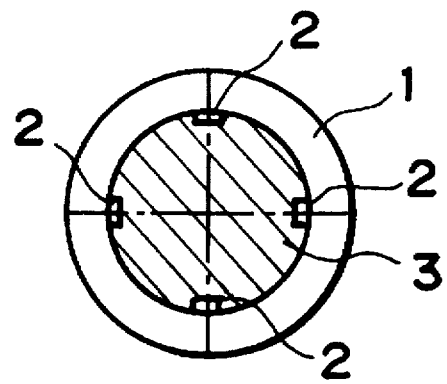
FIG. 4A–4D are sectional views each showing a circular section example of a terminal engaging member engaged with a photosensitive drum according to an embodiment of the present invention.
Figure 4B:
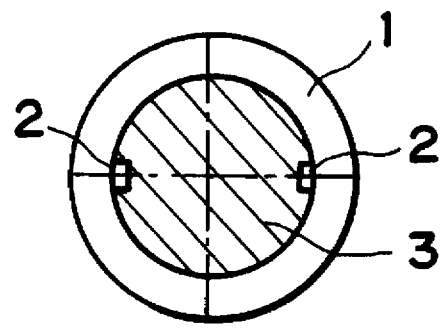
Figure 4C:
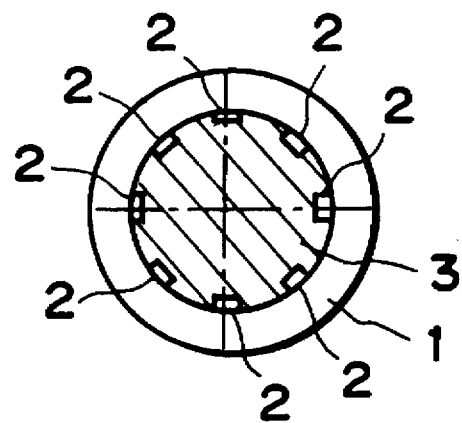
Figure 4D:
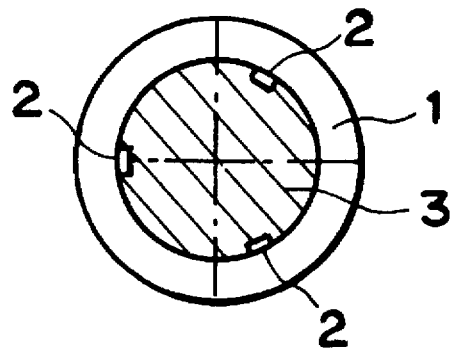

FIGS. 2 and 3 are a sectional view and a corresponding top plan view, respectively for illustrating the bending and cutting of a cylinder end brim For this purpose, a thrusting member 4 is abutted to and pushed against an end brim of the drum cylinder 3 after the gear or flange 1 is fitted into the cylinder 3 so as to thrust the end brim into the recess 2 of the gear or flange 1 while bending and shearing the brim.

The cylinder 3 is fitted about the outer periphery of the head 1a of the gear or flange 1. The fitting at this stage should preferably be not too loose as to allow relative movement between both members but free from deformation of the outer surface of the cylinder 3 brim. More specifically, a clearance of 0–10 μm is preferred between the gear or flange and the cylinder 3. Then, after the gear or flange 1 and the cylinder 3 are fitted with each other, a claw- or wedge-shaped thrusting member 4 having a tip of an acute angle is abutted against the outer periphery of the cylinder 3 at four parts around the head 1a of the gear or flange 1 as shown in FIG. 3. At this time, as shown in FIG. 2, each of the four thrusting members 4 is disposed at the same height as the lower end of the cylinder 3, and the tip thereof having a width identical to the width of the recess 2 is disposed in horizontal alignment with an associated one of the recesses 2 of the gear or flange 1 fitted into the cylinder 3 as shown in FIG. 3 and is then linearly moved along its axis for abutting. Then, after the abutting, each thrusting member 4 is caused to go forward with a certain penetration toward the axis of the gear or flange 1, whereby the end brim is bent from its very lower end along the surface shape of the thrusting member 4 and, on further penetration, the end brim is sheared at parts Corresponding to the widths of the recesses 2. As a result, cut and bent parts 3a of the end brim are intimately attached and fixed in the recesses 2, so that the gear or flange 1 and the cylinder 3 are securely fastened to each other.

At this time, the bent and cut part 3a of the end brim is intimately fastened to the recess 2 so that a high engaging force is exhibited without allowing relative movement or loosening between the cylinder 3 and the gear or flange 1 in the directions of the rotation and axis of the photosensitive drum. The recess 2 may be forced at an arbitrary plurality of parts. e.g., 2 parts, 3 parts, 4 parts, 8 parts or even more parts, preferably rotation-symmetrically with respect to the axis of the gear or flange 1 as shown in FIG. 4 for example.

The end peripheral section of the cylinder 3 subjected to the bending and cutting may desirably be exposed, i.e., free from coating of a photosensitive substance for a length of at least 1.0 mm, preferably at least 5.0 mm, from the very end in the longitudinal direction of the cylinder 3. The coating-free end section length should not be excessively large since at can decrease the image forming area formed by the coated area.

Figure 5:
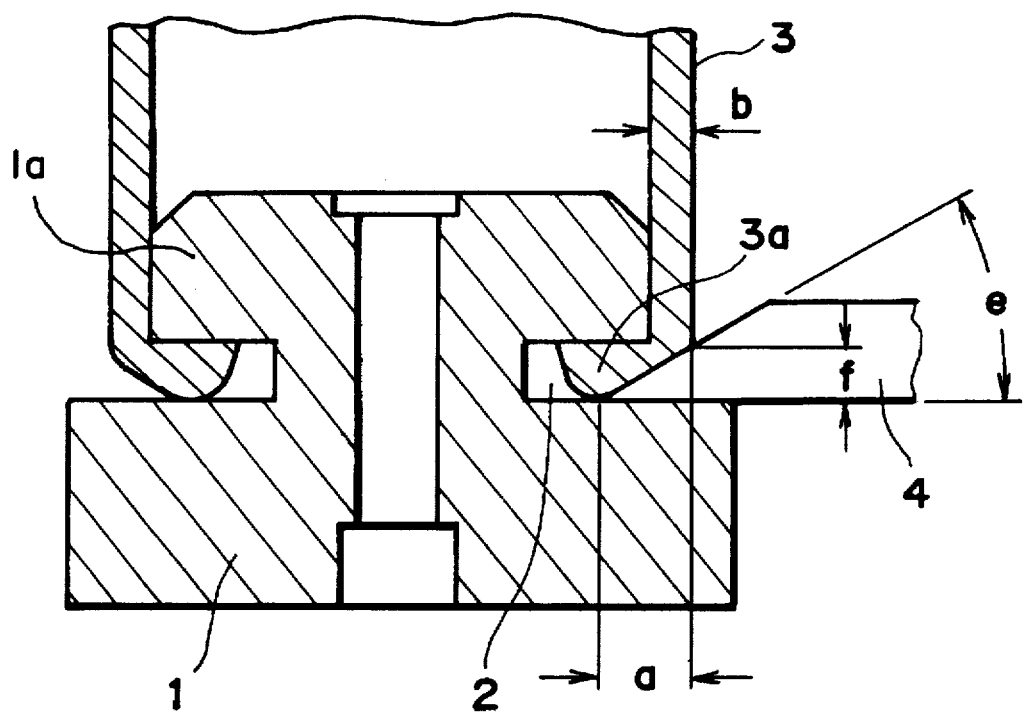
FIG. 5 is a sectional view for illustrating sizes involved in the bending and cutting step.

The sizes involved in the bending and cutting step will now be described with reference to FIG. 5. Referring to FIG. 5, the thrusting member 4 is allowed to enter for a penetration a toward inside the cylinder from the position where it just contacts the outer periphery of the cylinder 3. By adjusting the penetration a, it is possible to control the fastening force between the gear or flange 1 and the cylinder 3. The cylinder 3 has a thickness b and may ordinarily comprise a drawn pipe of an aluminum-based metal. In specific examples described hereinafter, an aluminum-based drawn pipe ("H63S" (trade name) available from Kobe Seiko K.K.) having a thickness b of 0.7 mm (outer diameter: 29.92 mm, inner diameter: 28.50 mm) and a length of 260.5 mm was used. A larger thickness b provides a larger fastening torque strength, but too large a thickness b requires a very large force for bending and cutting by the thrusting member 4, thus adversely affecting size accuracy of the surrounding parts. For this reason, a thickness b of 0.3–1.5 mm, particularly 0.6–1.0 mm, is preferred for sizes of a cylinder as described above. The thrusting member 4 may have tip angle e which may be arbitrarily set in consideration of its shape, etc., but basically an acute angle, preferably in the range of 10–70 degrees, more preferably 20–40 degrees. Incidentally, in the examples appearing hereinafter, a claw- or wedge-shaped thrusting member having smooth surfaces, a tip angle of 30 degrees and a width of 3 mm was used.

The end brim of the cylinder 3 is cut in a length of f. A larger cut length f provides a larger fastening force. The cut length f may depend on the penetration a and may preferably be at least 0.2 mm, particularly at least 0.4 mm. However, the length need not exceed 3 mm.

Figure 6:
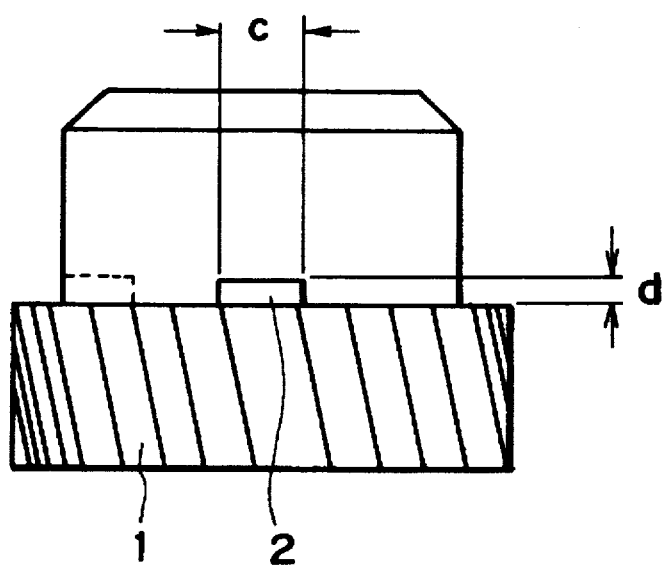
FIG. 6 is a sectional view for illustrating the sizes of a recess of the terminal engaging member (gear or flange), respectively, according to an embodiment of the invention.

FIG. 6 illustrates sizes of the recess 2 formed in the gear or flange 1. More specifically, the recess 2 has a width (peripheral length in a direction transverse to the axis of the gear of flange 1) c, and a height (length in the direction of the axis of the gear or flange 1) d. These sizes of the recess 2 may be set to appropriate values depending on the outer diameter and the thickness of the drum cylinder 3. For the above-described sizes of the cylinder, for example, the width c may desirably be at least 1 mm, and the height d may desirable be at least 0.5 mm. The shape of the recess 2 is not limited to a rectangular one but may be circular, arc (partial circle), triangular, etc. The shape and size of the recess can be changed depending on the shape and outer diameter of the gear or flange 1, and the tip shape of the thrusting member 4 can be changed correspondingly.

Figure 7:
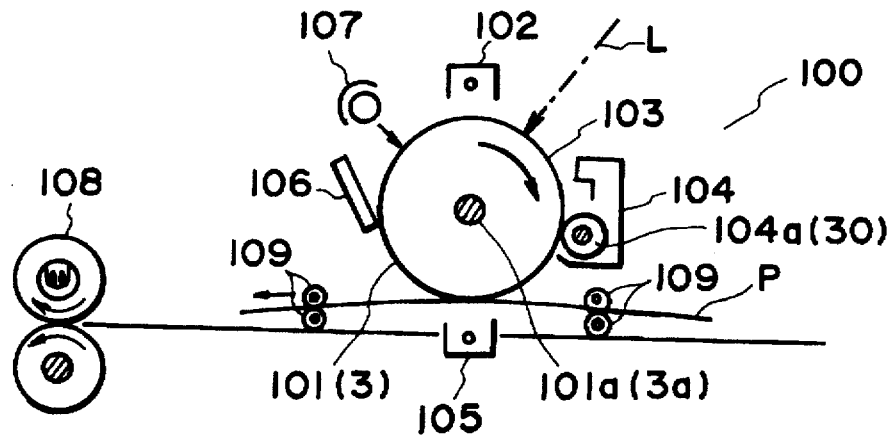
FIG. 7 is an illustration of an arrangement of an ordinary transfer-type electrophotographic apparatus using a photosensitive drum according to an embodiment of the present invention.

The cut and bent part of the cylinder end brim may preferably have a width which is in the range of 0.95–1 times the width of the recess 2, particularly identical to the width of the recess FIG. 7 shows an outline of an ordinary transfer-type electrophotographic apparatus including a photosensitive drum according to the present invention.

Referring to FIG. 7, the apparatus includes a photosensitive drum 101 as an image-bearing member which rotates about an axis 101a at a described peripheral speed in the direction of the arrow, the course of the rotation, the peripheral surface of the photosensitive drum 101 is uniformly charged to a positive or negative prescribed potential by a charging means 102 and then exposed to image light L by an imagewise exposure means (not shown, such as slit exposure means or laser beam scanning exposure means) at an exposure position 103. As a result, an electrostatic latent image corresponding to the exposure light image is sequentially formed on the peripheral surface of the photosensitive drum 101.

The electrostatic latent image is then developed with atoner by a developing means 104 including a developing sleeve 104a, and the resultant toner image is sequentially transferred by a transfer means 105 onto a transfer material or paper P which has been supplied between the photosensitive member 101 end the transfer means 105 in synchronism with the rotation of the photosensitive member 101 by a paper-supplying means including pairs of rollers 109. Herein, it is also possible to form the developing sleeve 104a as a cylindrical structure according to the present invention.

The transfer material P having received the toner image is separated from the photosensitive member surface and introduced to an image fixing means 108 for image fixation to be discharged as a copy product out of the apparatus.

The surface of the photosensitive member 101 after the image transfer is subjected to removal of transfer-residual toner by a cleaning means 106 to be cleaned, discharged by a pre-exposure means 107, and used for repetitive image formation.

A corona charging device is widely used in general as the uniform charging means 102 for the photosensitive member 101. A corona transfer means is also widely used in general as the transfer means 105.

In the electrophotographic apparatus, plural members including some of the above-mentioned photosensitive member 101, developing means 104, cleaning means 106, etc., can be integrally combined to form an apparatus unit so that the unit can be readily connected to or released from the apparatus body. For example, the photosensitive member 101 and the cleaning means 106 can be integrated into a single unit so that it can be attached to or released from the apparatus body by a guide means such as a guide rail provided to the apparatus body. In this instance, the apparatus unit can also be integrally accompanied with the charging means 102 and/or the developing means 104.

In a case where the electrophotographic apparatus is used as a copying machine or a printer, the image light L is a reflected light or transmitted light from an original, or an image light formed by coding read data from an original and scanning a laser beam or driving a light-emitting diode array or a liquid crystal shutter array based on the coded data.

Figure 8:
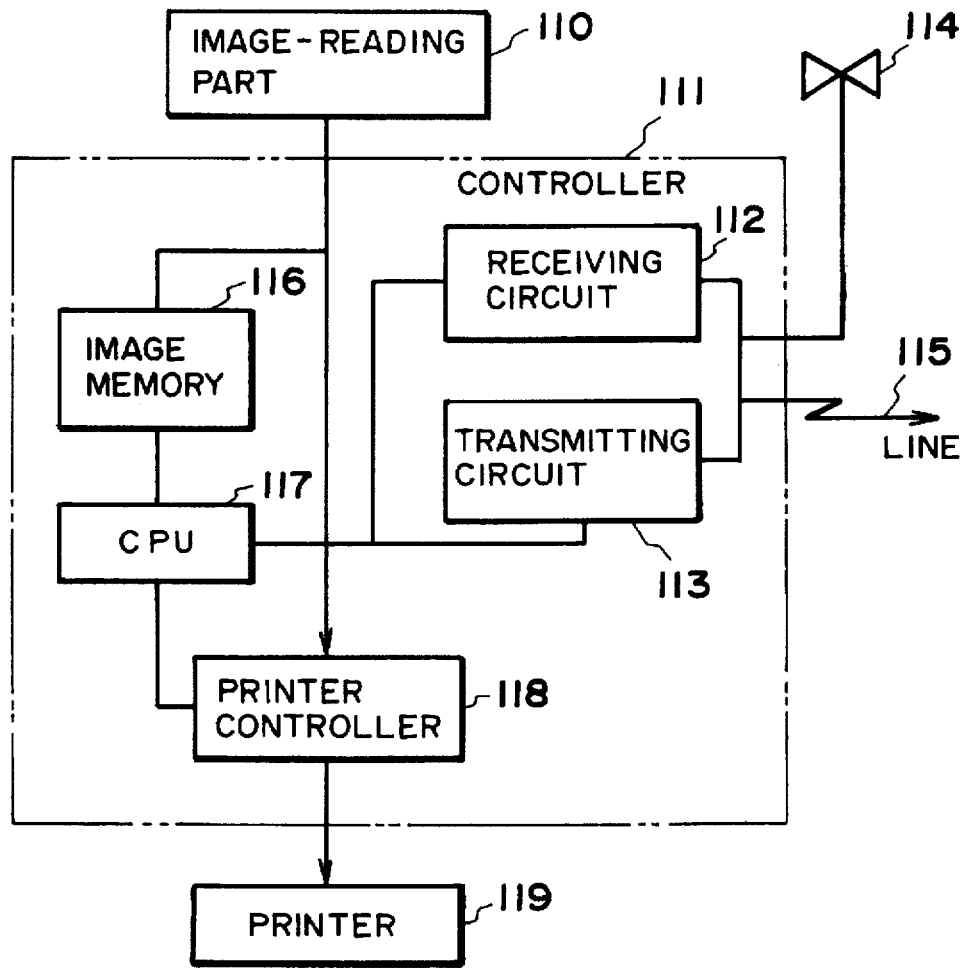
FIG. 8 is a block diagram of a facsimile apparatus including an electrophotographic apparatus equipped with a photosensitive drum according to an embodiment of the present invention as a printer.

In a case where the image forming apparatus is used as a printer for facsimile, the image light L may be replaced by exposure light image for printing received data. FIG. 8 is a block diagram for illustrating such an embodiment.

Referring to FIG. 8, a controller 111 controls an image reader (or image reading unit) 110 and a printer 119. The entirety of the controller 111 is regulated by a CPU 117. Data read from the image reader 110 is transmitted through a transmitter circuit 113 to a remote terminal such as another facsimile machine. On the other hand, data received from a remote terminal is transmitted through a receiver circuit 112 to a printer 119. An image memory 116 stores prescribed image data. A printer controller 118 controls the printer 119. A telephone handset 114 is connected to the receiver circuit 112 and the transmitter circuit 113.

More specifically, an image received from a line (or circuit) 115 (i.e., image data received from a remote terminal connected by the line) is demodulated by means of the receiver circuit 112, decoded by the CPU 117, and sequentially stored In the image memory 116. When image data corresponding to at least one page is stored in the image memory 116, image recording or output is effected with respect to the corresponding page. The CPU 117 reads image data corresponding to one page from the image memory 116, and transmits the decoded data corresponding to one page to the printer controller 118. When the printer controller 118 receives the image data corresponding to one page from the CPU 117, the printer controller 118 controls the printer 119 so that image data recording corresponding to the page is effected. During the recording by the printer 119, the CPU 117 receives another image data corresponding to the next page.

Thus, receiving and recording of an image may be effected in the above-described manner by using an electrophotographic apparatus equipped with an image-bearing member according to the present invention as a printer.

EXAMPLE 1

A photosensitive drum as shown in FIG. 1 was prepared through a process as explained with reference to FIGS. 1–6 above.

An aluminum-made drawn cylinder or tube ("H63S" (trade name) available from Kobe Seiko K.K.; inner diameter 28.50 mm and thickness of 0.7 mm respectively at the fitting ends; length: 260.5 mm) was coated by dipping with an ammoniacal aqueous solution of casein (casein 11.2 g, 28%-ammonia water 1 g, water 222 ml), followed by drying to form a primer layer at a rate of 1.0 g/m$^2$.

Then, 1 wt. part of aluminum chloride phthalocyanine, 1 wt. part of butyral resin ("Eslec BM-2" (trade name), available from Sekisui Kagaku K.K.) and 30 wt. parts of isopropyl alcohol were dispersed for 4 hours in a ball mill. The resultant dispersion was applied by dipping onto the above-prepared primer layer and dried to form a 0.3 μm-thick charge generation layer.

Separately, 1 wt. part of a hydrazone compound, 1 wt. part of polysulfone resin ("P1700" (trade name) available from Union Carbide Co.) and 6 wt. parts of monochlorobenzene were mixed under stirring. The resultant liquid was applied onto the charge generation layer by dipping and dried to form a 12 μm-thick charge transport layer, thus providing a coated drum cylinder 3 as shown in FIG. 1 in a state before bending.

Separately, a drum helical gear 1 (a module of 0.8 and a rightward twist angle of 10 degrees) was formed from polyacetal copolymer resin ("Duracon M90-02" (trade name) available from Polyplastic K.K.) by injection molding (under the conditions of nozzle temp.: 200° C., cylinder temp.: tip: 180° C., medium: 170° C., rear: 160° C.; mold temp.: cavity: 60° C., core: 60° C.) to have a head (inserted part) outer diameter of 28.49 mm and four rectangular recesses (width: 3 mm, height: 1.5 mm, depth: 3 mm) at 4 parts adjacent to the head and disposed at right angles from the axis of the gear 1.

To the gear 1 thus obtained, the above-prepared drum cylinder 3 was fitted so as to cover the head 1a of the gear 1 with its lower end brim, and four thrusting members 4 were caused to contact the outer surface of the lower end brim of the cylinder 3 as shown in FIG. 3. Each thrusting member 4 had a tip having a width of 3 mm and an angle (e) of 30 degrees and formed of SKD 30. After the contact, the thrusting members 4 were further pushed against the cylinder end brim at a penetration of 2.5 mm to bend and shear the end brim so as to conform to the shape of the recesses 2. The cut length of the cylinder end brim was 1.4 mm. Thus, the gear 1 was fastened to one end of the drum cylinder. Another gear was similarly fastened to the other end of the drum cylinder.

The thus obtained photosensitive drum was loaded in a process cartridge for a laser beam printer ("LBP-SX" (trade name) available from Canon K.K.) and the process cartridge was left standing for 48 hours in an environment of high temperature—high humidity (32.5° C.-85% RH). Then, the process cartridge was loaded in the laser beam printer and subjected to an image forming test of 10000 sheets. During the test, good images were obtained without occurrence of irregularities, such as pitch irregularities or fog, which might be attributable to the photosensitive drum. After the image forming test, the photosensitive drum was taken out of the cartridge to examine whether any defects, such as play, loosening and dislocation, occurred at the joint between the gear and the cylinder, no defects in these respects were observed at all. Further, during the continuous image forming test, no noise was caused due to friction of the drum gear so that a smooth rotation of the drum gear was confirmed.

Further, as a result of image quality evaluation of halftone images, very good images were obtained free from drum gear pitch irregularity.

Finally, the photosensitive drum after the image forming test was fixed and subjected to measurement of a rupture torque at the joint by means of a commercially available torque gauge, whereby the rupture was caused at a torque of 160 kg-cm, which is sufficiently large from a practical viewpoint.

EXAMPLE 2

A photosensitive drum was prepared in the same manner as in Example 1 except that the thrusting member after the contact was further pushed to cause a penetration of 2.0 mm. The cut length at the sheared part of the cylinder end brim was 1.10 mm. The resultant photosensitive drum was evaluated in the same manner as in Example 1, whereby similar results were obtained. The rupture torque of the photosensitive drum at the joint after the image forming test was 145 kg-cm.

EXAMPLE 3

A photosensitive drum was prepared in the same manner as in Example 1 except that the penetration of the thrusting member after the contact was changed to 1.5 mm. The cut length at the sheared part of the cylinder end brim was 0.85 mm. The resultant photosensitive drum was evaluated in the same manner as in Example 1, whereby similar results were obtained. The rupture torque of the photosensitive drum at the joint after the image forming test was 122 kg-cm.

EXAMPLE 4

A photosensitive drum was prepared in the same manner as in Example 1 except that the penetration of the thrusting member after the contact was changed to 1.0 mm. The cut length at the sheared part of the cylinder end brim was 0.55 mm. The resultant photosensitive drum was evaluated in the same manner as in Example 1, whereby similar results were obtained. The rupture torque of the photosensitive drum at the joint after the image forming test was 70 kg-cm.

COMPARATIVE EXAMPLE 1

A drum gear and a drum cylinder prepared in the same manner as in Example were bonded to each other with 0.08 g of an instant adhesive ("ARONALPHA 432FTW" (trade name) available from Toa Gosei Kagaku Kogyo K.K. and left standing for 48 hours in an environment of 32.5° C. and 85% RH for complete curing. The resultant photosensitive drum was evaluated in the same manner as in Example 1, whereby the gear was dislocated after about 500 sheets of image formation. The part of the bonding failure was observed to be caused as an interfacial breakage at the boundary between the drum gear and the adhesive. The rupture torque at this time was 55 kg-cm.

COMPARATIVE EXAMPLE 2

A drum cylinder and a drum gear prepared in the same manner as in Example 1 were fastened with each other in a similar manner as in Example 1 except that the thrusting member after contacting the periphery of the cylinder was further pushed to cause a penetration of only 0.5 mm whereby the gear was engaged with the cylinder only by staking. i.e. without causing cutting, of the cylinder.

The thus prepared cylinder was evaluated in the same manner as in Example 1 whereby a play of about 0.5 mm occurred in the rotational direction at the time of 6000 sheets during the durability test. After the durability test, the joint between the photosensitive drum and the drum gear was observed, whereby the stated part of the cylinder was not sheared but a gap was found with the recess. The rupture torque at this time was 62 kg-cm.

The above-mentioned results of Examples and Comparative Examples are summarized in the following Table 1.

intimately fastened to the engaging member. As a result, the resultant fastened structure can always show a stable engagement force without being affected by external factors under various environmental conditions (ranging from low temperature—low humidity to high temperature—high humidity). Further, a strong engagement force as represented by a torque strength comparable to even higher than those obtained by conventional method of fastening as by adhesion or force fitting can be obtained by a simple production step. The resultant joint structure is so stable that the fastened drum gear is not out of position even under application of a repetitive impact force in the axial direction due to the use of a helical gear.

(4) The engagement or fastening between the terminal engaging member and the cylinder can be effected by a simple method of pressing a thrusting or protruding member from an outer periphery of the cylinder. Accordingly, a complete curing time as required in the conventional bonding method is not required but the engagement can be performed instantaneously, thus being advantageous in reelects of productivity and production cost.

(5) Further, as no adhesive is required, it is not required to exercise the control of the property of the adhesive or employ the drying step and storage space after the bonding.

(6) Further, the engagement torque strength is not affected by the material of the terminal engaging member, so

TABLE 1

| | Shape of gear teeth | Manner of fastening | Penetration (mm) | Cut length (mm) | Number of copied sheets, results | Image evaluation | Noise | Rupture torque (kg-cm) |
|---|---|---|---|---|---|---|---|---|
| Example 1 | helical | bending & cutting | 2.5 | 1.40 | 1000 sheets, no play or loosening | good | good | 160 |
| Example 2 | " | bending & cutting | 2.0 | 1.10 | 1000 sheets, no play or loosening | " | " | 145 |
| Example 3 | " | bending & cutting | 1.5 | 0.85 | 1000 sheets, no play or loosening | " | " | 122 |
| Example 4 | " | bending & cutting | 1.0 | 0.55 | 1000 sheets, no play or loosening | " | " | 70 |
| Comp. Example 1 | helical | bonding | — | — | Gear disclosed at 5000 sheets | good | good | 55 |
| Comp. Example 2 | " | shaking | 0.5 | 0 | Play of 0.5 mm at 6000 sheets | good | good | 62 |

As described above, the cylindrical structure obtained according to this embodiment has the following advantageous features.

(1) A terminal engaging member having a helical gear is fastened to at least one end of a cylinder so as exert a thrust for pushing the cylindrical structure in its axial direction, whereby a photosensitive drum including the cylindrical structure is always rotated at a normal position free from a positional deviation in the axial direction, thus stably providing high-quality images.

(2) The helical gear in the terminal engaging member having oblique teeth provides a larger rate of engagement than a spur gear and cause little vibration due to gear engagement, so that a smooth rotation of the terminal engaging member is obtained to cause little noise during the drive.

(3) In the cylindrical structure, the end brim of the cylinder is bent and cut into recesses adjacent to the head of the terminal engaging member inserted into the cylinder so that the cut and bent brim is caused to be that the material thereof can be freely selected in view of its purpose and usage.

(7) In the cylindrical structure, the cylinder and the terminal engaging member are fastened with each other at a strong engaging force. The strong engaging force is given by bending and cutting the end brim of the cylinder into the recess of the terminal engaging member adjacent to the head inserted into the cylinder. This is because, by bending accompanied with cutting, instead of simple bending, of the end brim of the cylinder, the bent and cut end brim is caused to intimately enter the recess of the terminal engaging member. The bending and cutting of the cylinder end brim can be easily performed by using a wedge- or claw-shaped thrusting member.

It is possible to apply the embodiment described with reference to FIGS. 1–7 to a developing sleeve as will be described with reference to FIGS. 9–13.

Now, an embodiment of using a cylinder having an inner surface processed for socket joint in order to provide a further improved accuracy of joint or fastening will be described with reference to FIGS. 9–13 based on application to a developing sleeve as an example of the cylindrical structure. This embodiment is of course applicable to a photosensitive drum as described in the previous embodiment. It is also possible to combine the previous embodiment and the following embodiment in order to form a cylindrical structure, e.g., for fastening a terminal engaging member equipped with a helical gear to a photosensitive drum cylinder having an inner surface processed for socket joint.

First of all, a developing apparatus using a developing sleeve will be described.

In an image forming apparatus using electrophotography, etc., it has been practiced to develop an electrostatic image formed on a photosensitive drum with a developer to form a toner image as a visible image. As a type of such a developing apparatus, there has been known one wherein a one-component type developer comprising a magnetic toner is used.

In such a developing apparatus using a one-component type developer comprising a magnetic toner, the developer is provided with an electric charge of a polarity opposite to that of an electrostatic image on a photosensitive drum by friction between developer particles and also between the developer and a developing sleeve. The developer thus provided with an opposite polarity charge is regulated by a developer regulating member to form a thin layer of the developer which is then conveyed to a developing position under the action of a magnetic field given by a fixed magnet within the developing sleeve. At the developing position, the developer is caused to fly and be attached onto the electrostatic image on the photosensitive drum to develop the electrostatic image as a toner image.

As is disclosed in, e.g., JP-A 57-66455, the developing sleeve may be formed by toughening the surface of a cylinder of a metal, such as aluminum, nickel, stainless steel or alloys of these metals, e.g., by electrolysis., blasting, or filing. The surface may be coated with a film in a prescribed thickness of a paint comprising, e.g., graphite or carbon black, a phenolic resin and isopropyl alcohol (JPA) in mixture and dispersion and air-sprayed onto the cylinder surface. Finally, flanges are fastened to the cylinder ends to assemble a developing sleeve.

As described above, such a developing sleeve is disposed opposite to the photosensitive drum and is rotated by a driving force supplied by gear engagement to provide the developer with a charge and convey the developer to the developing position, so that the developing sleeve is required to show mechanical properties, such as uniform and smooth rotation characteristic, mechanical strength in resistance to the rotation torque exerted thereby and stability under various environmental conditions.

Now, production of a developing sleeve, for example, according to this embodiment will be described with reference to FIGS. 9–11.

Similarly as in the previous embodiment, the cylinder 33 may preferably have an end brim section having a thickness of 0.3–1.5mm, particularly 0.5–1.5 mm. The cut length of a bent and cut portion of the cylinder end brim may preferably be at least 0.2 mm, particularly at least 0.25 mm.

In this embodiment, the cylinder 33 comprising aluminum, copper, stainless steel, etc., provided with an end brim section B where the cylinder inner surface is processed to improve the inner diameter accuracy, e.g., by machining, such as cutting, abrading or grinding, in order to improve the fitting accuracy with an engaging member.

Into this inner surface-processed section B of the cylinder 33, a head 31a of a flange 31 of, e.g., an insulating plastic is lightly press-fitted. In or adjacent to the head 31a, the flange 31 is provided with recesses 32 of appropriate dimensions, such as width, length and depth. To and end brim part of the cylinder, a generally claw-or wedge-shaped thrusting member 34 having a tip forming an acute angle and a width almost equal to the recess 32 is abutted and pushed toward the inside of the recess 32 in a certain amount of penetration, whereby the cylinder end brim is bent and sheared simultaneously in a shape conforming with the recess 32. The sheared part of the bent and cut end brim is intimately attached to and fitted with the recess con, our, and the bent and cut part 33a (particularly the inner surface thereof) of the end brim is intimately attached to the side and bottom of the recess, whereby a reliable fastening is secured.

Hereinbelow, the details of this embodiment will be described with reference to drawings. FIG. 9 is a sectional view of a developing sleeve according to this embodiment. Referring to FIG. 9, the developing sleeve includes a flange 31 as a terminal engaging member engaged with the ends of the developing sleeve for rotatably supporting the photosensitive drum and provided with recesses 32, and a cylinder (cylindrical substrate) 33 of aluminum alloy. The inner surface of the fitting portion B of the cylinder 33 is processed by cutting, abrading or grinding for press-fitting with the flange head at a press fit margin (a subtraction of the cylinder inner diameter at the processed portion B from the outer diameter of the flange head 31 before insertion) of 5–180 μm. The press fit margin may be determined arbitrarily within an extent of not adversely affecting the function of the developing sleeve while it can depend on the materials of the flange 31 and the cylinder 33, and the fitting length. In a sense, the inner surface-processing of the cylinder end brim has a function of thinning the end brim portion so as to be suitable for bending-and-cutting and for light press fitting with the head while retaining the mechanical strength of the entire cylinder.

Figures 9, 10:
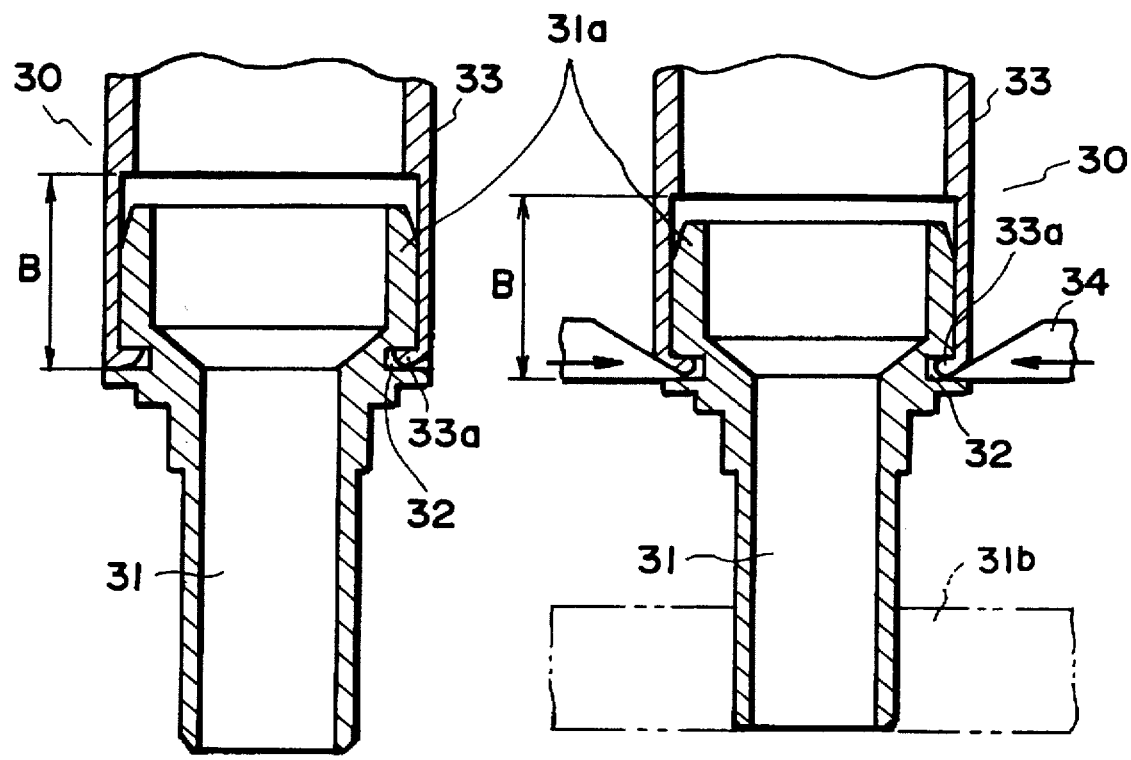
FIG. 9 is a partial sectional view of a developing sleeve according to an embodiment of the invention.
FIG. 10 is a sectional illustration of a cylinder and in a bending and cutting step.
Figure 11:
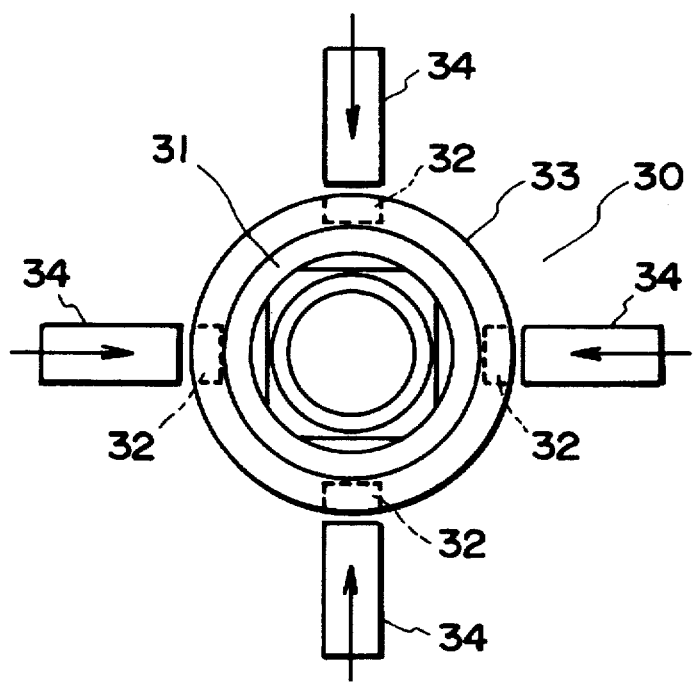
FIG. 11 is a corresponding to plan view, according to an embodiment of the invention.

FIGS. 10 and 11 are a sectional view and a corresponding top plan view, respectively, for illustrating the bending and cutting of a cylinder end brim. For this purpose, a thrusting member 34 is abutted to and pushed against an end brim of the sleeve cylinder 33 after the flange 31 is fitted into the cylinder 33 so as to thrust the end brim into the recess 32 of the flange 31 while bending and shearing the brim.

The inner surface-processed part B of the cylinder 33 is fitted about the outer periphery of the head 31a of the flange 31. The fitting at this stage should preferably be light-press fitting with a press fit margin of preferably 5–180 μm, more preferably 5–100 μm, further preferably 5–50 μm.

Then, after the flange 31 and the cylinder 33 are fitted with each other, a claw- or wedge-shaped thrusting member 34 having a tip of an acute angle is abutted against the outer periphery of the cylinder 33 at four parts around the head 31a of the flange 31 as shown in FIGS. 10 and 11. At this time, as shown in FIG. 10, each of the four thrusting members 34 is disposed at the same height as the lower end of the cylinder 33, and the tip thereof having a width identical to the width of the recess 32 is disposed in horizontal alignment with an associated one of the recesses 32 of the flange 31 fitted into the cylinder 33 as shown in FIG. 11 and is then linearly moved along its axis for abutting. Then, after the abutting, each thrusting member 34 is caused to go forward with a certain penetration toward the inside of the flange 31, whereby the end brim is bent from its very lower end along the surface shape of the thrusting member 34 and, on further penetration, the end brim is sheared at parts corresponding to the widths of the recesses 32. AS a result, cut and bent parts 33a of the end brim are intimately attached and fixed in the recesses 32, so that the flange 31 and the cylinder 33 are securely fastened to each other.

More specifically, the bent and cut part 33a of the end brim is intimately fastened to the recess 32 so that a high engaging force is exhibited without allowing relative movement or loosening between the cylinder 33 and the flange 31 in the directions of the rotation and axis of the developing sleeve. The recess 32 may be formed at an arbitrary plurality of parts, e.g., 2 parts, 3 parts, 4 parts, 8 parts or even more parts, preferably rotation-symmetrically with respect to the axis of the flange 31.

Figure 12:
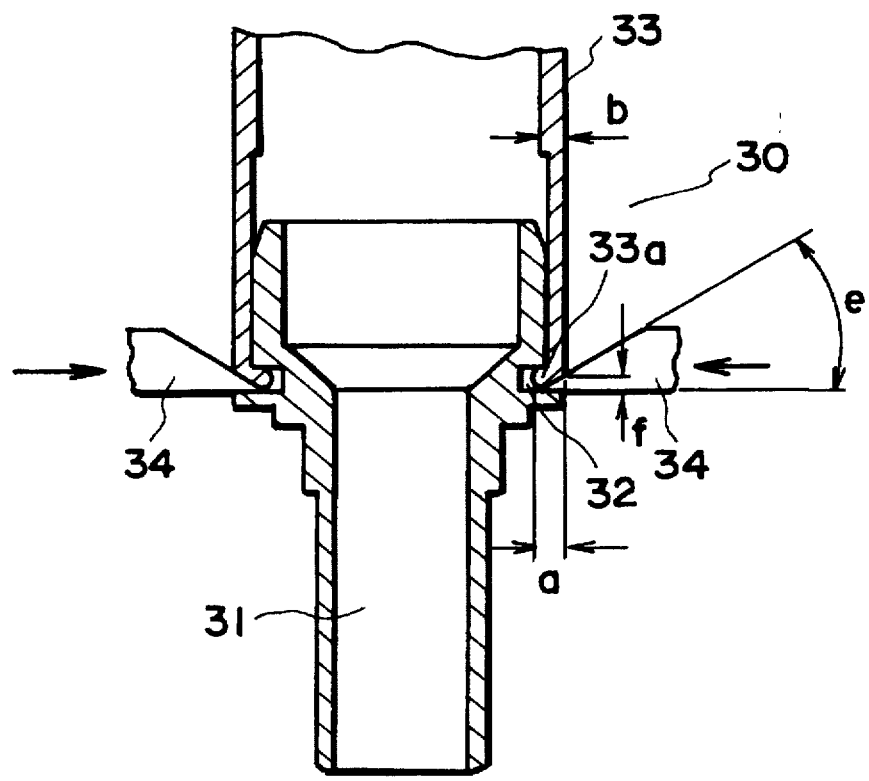
FIG. 12 is a sectional view for illustrating sizes involved in the bending and cutting step.

The sizes involved in the bending and cutting step will now be described with reference to FIG. 12. Referring to FIG. 12, the thrusting member 34 is allowed to enter for a penetration a toward inside the cylinder from the position where it just contacts the outer periphery of the cylinder 33. By adjusting the penetration a, it is possible to control the fastening force between the flange 31 and the cylinder 33. The cylinder 33 has a thickness b. A larger thickness b provides a larger fastening torque strength, but too large a thickness b requires a very large force for bending and cutting by the thrusting member 34, thus adversely affecting the size accuracy of the surrounding parts. For this reason, a thickness b of 0.3–1.5 mm, particularly 0.6–1.0 mm, is preferred for sizes of a cylinder as described above. The inner surface processing alleviates the above thickness contradiction regarding the strength and the easiness of cutting and bending. The thrusting member 34 may have a tip angle e which may be arbitrarily set in consideration of its shape, etc., but basically an acute angle, preferably in the range of 10–70 degrees, more preferably 20–40 degrees. Incidentally, in the examples appearing hereinafter, a claw- or wedge-shaped thrusting member having smooth surfaces, a tip axle of 30 degrees and a width of 3 mm was used.

The end brim of the cylinder 33 is cut in a length of f. A larger cut length f provides a larger fastening force. The cut length f may depend on the penetration a and may preferably be at least 0.2 mm, particularly at least 0.4 mm.

Figure 13:
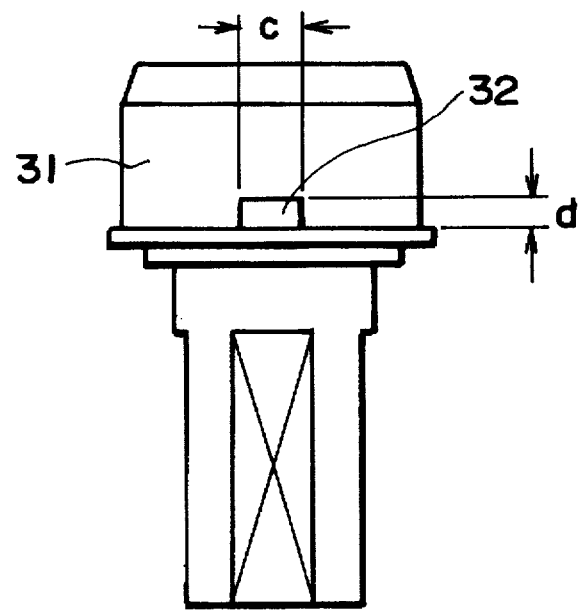
FIG. 13 is a sectional view for illustrating the sizes of a recess formed in a flange, according to an embodiment of the invention.

FIG. 13 illustrates sires of the recess 32 formed in the gear or flange 1. More specifically, the recess 32 has a width (peripheral length In a direction transverse to the axis of the gear of flange 31) c, and a height (length in the direction of the axis of the gear or flange 31) d. These sizes of the recess 32 may be set to appropriate values depending on the outer diameter and the thickness of the sleeve cylinder 33. For the above-described sizes of the cylinder, for example, the width c may desirably be least 1 mm, and the height d may desirable be at least 0.5 mm. the shape of the recess 32 is not limited to a rectangular one but may be circular, arc (partial circle), triangular, etc. The shape and size of the recess can be changed depending on the shops and outer diameter of the gear or flange 31, and the of the thrusting member 34 can be changed correspondingly.

The cut and bent part of the cylinder end brim may preferably have a width which is in the range of 0.95–1 times the with of the recess 32, particularly identical to the width of the recess 32.

The developing sleeve 30 according to this embodiment may be applicable to any image forming apparatus utilizing electrophotography, etc., and the developer used therewith may be any of the known one-component type and two-component type developers. Further, as one example is shown in FIG. 10, the developing sleeve may be equipped with a helical gear 31b (shown by two dots-and-dash lines) at its end. By using such a helical gear, a driving force is smoothly transmitted to the sleeve and the position of the sleeve 30 can be accurately determined.

EXAMPLE 5

An aluminum drawn cylinder 33 (mfd. by Showa Aluminum K.K.; outer dia.=16 mm, inner dia.=14.40 mm, thickness=0.8 mm, length=248 mm) was inner surface-processed at its end portions of each 10 mm from the very end with a cut thickness of 0.1 mm (one side).

Then, the outer surface of the cylinder was sand-blasted with alundum particles by a sand-blasting machine of an ordinary jet air type ("Pneumablaster", mfd. by Fuji Seisakusho K.K.) at an ejection pressure of 4 kg/cm$^2$ for 60 sec. while rotating the cylinder at 20 rpm. The resultant sleeve cylinder had an average surface roughness (Ra, counter line average surface roughness according to JIS B-0601) of 3.0 µm.

Then, a paint was prepared by mixing the following composition:

| Phenolic resin | 20 wt. part(s) |
|---|---|
| Natural graphite (dav. = 7 µm) | 9 wt. part(s) |
| Carbon black (Dav. = 0.2 µm) | 1 wt. part(s) |
| IPA | 20 wt. part(s) | followed by dispersion together with glass beads in a paint shaker for 30 min. The paint, after being adjusted to a solid content of 25%, was air-sprayed onto the sleeve cylinder 33 to form a film, which was then cured under heating at 150° C. for 30 min. in a hot air drying oven. The resultant coating showed an average surface roughness (Ra) of 2.4 µm.

To both ends of the developing sleeve thus formed, a sleeve flange made by injection molding of a polyacetal resin ("Duracon AW-01", made by Polyplastic K.K.) was fitted at a press fit margin of 50 µm. The flange was provided with four rectangular recess 32 (width=3 mm, height=1 mm, and depth=3 mm) at 4 parts adjacent to the head 31a and disposed at right angles from the axis of the flange.

Then, to the end brim of the developing sleeve fitted about the head and recesses 32 of the flange 31, four thrusting members 34 were abutted at the positions of the recesses and further pushed at a penetration of 1.5 mm against the end brim to bend and cut the brim at a cut length of 0.85 mm, whereby the flanges 31 were fastened to the developing sleeve 33. Each thrusting member had a tip width of 3 mm and a tip angle of 30 degrees and was made of SKD 30.

The thus obtained developing sleeve 30 was then subjected to a flange swing test in the following manner in order to evaluate whether the flange 31 and the sleeve cylinder 33 were fastened to each other at a high accuracy without being inclined or bent.

The developing sleeve 30 was held in parallel with a master gauge (outer dia.=16 mm, and length=300 mm) with two spacers (cylindrical shape with dia.=8 mm, height=10 mm) disposed at two end parts of the sleeve to provide their peripheral circular surfaces as contacting surfaces and sandwiched between the developing sleeve and the master gauge. The held developing sleeve and master gauge held in parallel were illuminated with laser light incident at right angles from a laser length meter, and the distance between the flange outer surface and the master gauge was measured while rotating the developing sleeve 30. The difference between the maximum and the minimum values of the distance during one rotation of the developing sleeve was measured as a flange swing which was found to be 10 µm in this Example as a result of the measurement.

The above-prepared developing sleeve was loaded in a cartridge 50 for a laser beam printer ("LBP-SX", mfd. by Canon K.K.) and left standing for 48 hours in an environment of normal temperature—normal humidity (25° C.-40% RH), and then the cartridge was loaded in the laser beam printer in the same environment and subjected to an image forming test of 5000 sheets. During the test, good images were obtained without occurrence of irregularities, such as pitch irregularities or fog, due to the developing sleeve.

EXAMPLES 6–9

Developing sleeves were prepared and tested for image formation in the same manner as in Example 5 except that the press fit margins were changed as shown in Table 2 appearing hereinafter. The results are also shown in Table 2.

COMPARATIVE EXAMPLE 3

An aluminum drawn cylinder identical to the one used in Example 5 as drawn and without inner surface processing was sand-blasted and film-coated in the same manner as in Example 5.

An instant adhesive ("ARONALPHA 432FTW" (trade name) available from Toa Gosei Kagaku Kogyo K.K.) was applied to the fitting portion inner surface of the cylinder, into which a head of a sleeve flange prepared by injection molding of polycarbonate resin ("Yupilon LS2030" (trade name) available from Mitsubishi Gas Kagaku K.K. and containing 15 wt. % of fluorine-containing resin powder) was inserted for fitting with a clearance of 50–60 µm between the flange head outer diameter and the cylinder inner diameter. Then, the structure was left standing for 48 hours in an environment of normal temperature—normal humidity (25° C.-40% RH) for complete curing. The thus obtained developing sleeve was evaluated in the same manner as in Example 5. The results are also shown in the following Table 2.

TABLE 2

|  | Manner of fastening | Press fit margin | Flange swing | Pitch irregularity | Image density |
|---|---|---|---|---|---|
| Example 5 | press fitting + bending & curring | 50 (µm) | 10 (µm) | ⊚ | ⊚ |
| Example 6 | press fitting + bending & curring | 80 | 13 | ⊚ | ⊚ |
| Example 7 | press fitting + bending & curring | 120 | 15 | ⊚ | ⊚ |
| Example 8 | press fitting + bending & curring | 150 | 20 | ○ | ○ |
| Example 9 | press fitting + bending & curring | 180 | 24 | ○ | ○ |
| Comp. Example 3 | bending | −50 (clearance fitting) | 74 | x | ○ |

The following experiments (Examples 10–13 and Comparative Example 4) were performed regarding the fastening strength between the flange and the cylinder.

EXAMPLE 10

A developing sleeve was prepared in the same manner as in Example 5 except that the penetration of the thrusting member after the contact was changed to 2.5 mm. The cut length at the sheared part of the cylinder end brim was 1.4 mm. The resultant developing sleeve was loaded in a process cartridge for a laser beam printer ("LBP-SX" (trade name) available from Canon K.K.) and the process cartridge was left standing for 48 hours in an environment of high temperature—high humidity (32.5° C.-85%RH). Then, the process cartridge was loaded in the laser beam printer and subjected to an intermittent image forming rest of 10000 sheets in the same environment. During the test, good images were obtained without occurrence of irregularities, such as pitch irregularities or fog, which might be attributable to the developing sleeve. After the image forming test, the developing sleeve was taken out of the cartridge to examine whether any defects, such as play, loosening and dislocation, occurred at the joint between the flange 31 and the cylinder 33, occurred. As a result, no defects in these respects were observed at all. The developing sleeve after the image forming test was fixed and subjected to measurement of a rupture torque at the joint by means of a commercially available torque gauge, whereby the rupture was caused at a torque of 70 kg-cm.

EXAMPLE 11

A developing sleeve was prepared in the same manner as in Example 10 except that the penetration of the thrusting member after the contact was changed to 2.0 mm. The cut length at the sheared part of the cylinder end brim was 1.10 mm. The resultant developing sleeve was evaluated in the same manner as in Example 10, whereby similar results were obtained. The rupture torque of the developing sleeve at the joint after the image forming test was 60 kg-cm.

EXAMPLE 12

A developing sleeve was prepared in the same manner as in Example 10 except that the penetration of the thrusting member after the contact was changed to 1.5 µm. The cut length at the sheared part of the cylinder end brim was 0.85 mm. The resultant developing sleeve was evaluated in the same manner as in Example 10, whereby similar results were obtained. The rupture torque of the developing sleeve at the joint after the image forming test was 45 kg-cm.

EXAMPLE 13

A developing sleeve was prepared in the same manner as in Example 10 except that the penetration of the thrusting member after the contact was changed to 1.0 mm. The cut length at the sheared part of the cylinder end brim was 1.55 mm. The resultant developing sleeve was evaluated in the same manner as in Example 10, whereby similar results were obtained. The rupture torque of the developing sleeve at the joint after the image forming test was 35 kg-cm.

COMPARATIVE EXAMPLE 4

A sleeve flange and a sleeve cylinder prepared in the same manner as in Comparative Example 3 were bonded to each other with 0.08 g of an instant adhesive ("ARONALPHA 432FTW" (trade name) available from Toa Gosei Kagaku Kogyo K.K. and left standing for 48 hours in an environment of 32.5° C. and 85% RH for complete curing. The resultant developing sleeve was evaluated in the same manner as in Example 10, whereby the flange was dislocated after about 500 sheets of image formation. The part of the bonding failure was observed to be caused as an interfacial breakage at the boundary between the flange and the adhesive. The rupture torque at this time was 22 kg-cm.

The above-mentioned results of Examples 10–13 and Comparative Example 4 are summarized in the following Table 3.

TABLE 3

|  | Manner of fastening | Penetration | Cut length | Number of copied sheets, results | Rupture torque kg-cm |
| --- | --- | --- | --- | --- | --- |
| Example 10 | bending & cutting | 2.5 mm | 1.40 mm | 10000 sheets, no play or loosening | 70 |
| Example 11 | bending & cutting | 2.0 mm | 1.10 mm | 10000 sheets, no play or loosening | 60 |
| Example 12 | bending & cutting | 1.5 mm | 0.85 mm | 10000 sheets, no play or loosening | 45 |
| Example 13 | bending & cutting | 1.0 mm | 0.55 mm | 10000 sheets, no play or loosening | 35 |
| Comp. Example 4 | bonding | — | — | Flange disclosed at 500 sheets | 22 |

As described above, the developing sleeve obtained according to this embodiment has the following advantageous feature in addition to (3)–(7) described with reference to the previous embodiment of the photosensitive drum provided with a helical gear after Table 1.

Thus, in the developing sleeve, the flange can be fastened to the cylinder at a high accuracy without being inclined or bent with respect to the cylinder. Accordingly, the occurrence of pitch irregularity due to rotation cycle of the developing sleeve is effectively suppressed to provide higher quality images.

Incidentally, the developing sleeve is supported by a developing apparatus unit by the medium of the flanges fastened to its ends and is rotated about the central axes of the flanges. At this time, if the central axes of the flanges and the central axis of the cylinder substrate are deviated, the developing sleeve is rotated in an unstable manner to cause pitch irregularity leading to inferior image qualities. According to the above embodiment, however, the flanges can be fastened at a further improved accuracy, so that the occurrence of the pitch irregularity is effectively alleviated to provide high quality images.

Incidentally, this embodiment of inner surface-processing of a cylinder can also be applied to photosensitive drums, etc., as explained with reference to FIGS. 1–6.

Now, an embodiment of a process cartridge which the above embodiments can be applied will be described with reference to FIG. 14.

Figure 14:
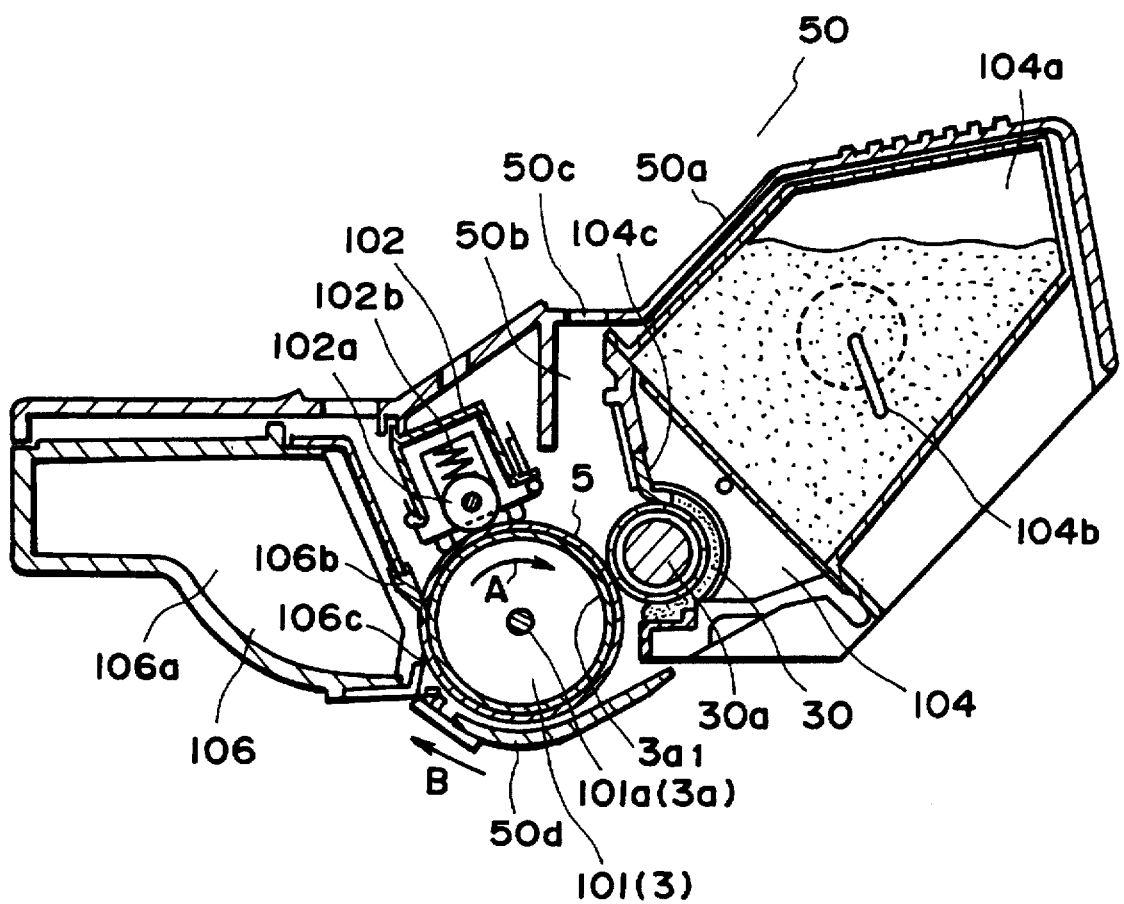
FIG. 14 is a side sectional view of a process cartridge according to an embodiment of the invention.

Referring to FIG. 14, a process cartridge 50 according to this embodiment comprises an electrophotographic photosensitive drum 3 as an image bearing member, and charging means 102, developing means 104 containing a toner (developer) and cleaning means 106 disposed around the photosensitive drum 3. These members are integrally disposed within a housing 50a to form a cartridge, which is detachably mountable to the main assembly of an image forming apparatus.

The respective parts of the process cartridge will now be described.

The photosensitive drum 101 (3) comprises an aluminum cylinder 3a1 coated with an organic photoconductive layer 3a2 on its outer peripheral surface, and both ends of the drum axis 101a (3a) are rotatably supported by the housing 50a. A driving force from a drive motor (not shown) is transmitted via a helical gear 6 (FIG. 1) to a helical gear 1 connected to the photosensitive drum 101 (3) to rotate the photosensitive drum in the direction of an arrow A according to an image forming operation. The photosensitive drum 3 may be constituted by applying the above embodiment described with reference to FIGS. 1–6 or/and the embodiment described with reference to FIGS. 9–13.

The charging means 102 is of the so-called contact charging type and comprises an electroconductive roller 102a, which is caused to contact the photosensitive drum 3 and is supplied with a voltage to uniformly charge the surface of the photosensitive drum 3. The roller 102a is pushed against the drum 3 by a spring 102b.

The process cartridge 50 is further provided with an exposure section 50b where the photosensitive drum 3 charged by the above-mentioned charging means 102 is exposed to image light issued from an apparatus main assembly and entering through the exposure slit 50c.

The developing means 104 is disposed to visualize the electrostatic latent image by development with a toner.

As shown in FIG. 14, the developing means 104 comprises a container 104a for storing the toner and a toner feeding mechanism 104b disposed within the container 104a and rotates to feed the toner to the forward section of the container 104a where a developing sleeve 30 and a blade 104c are disposed.

In image formation, the developing means is driven to successively form visual images with the toner on the photosensitive drum 3. More specifically, the toner within the container 104a is fed to the forward section thereof by the toner feeding mechanism 104b, and the toner is applied in a thin charged layer on the circumference of the rotating sleeve 30 by the blade 104c. A developing bias is applied between the sleeve 30 and the photosensitive drum 3 bearing a latent image, the latent image is developed with the toner. The developing sleeve 30 is formed according to the embodiment described with reference to FIGS. 9–13.

The position of the developing means is determined by a position-determining mechanism (not shown) so as to confront the photosensitive drum 3 with a minute clearance (on the order of 250 μm). The sleeve 30 is connected to a high-voltage source disposed within the apparatus main assembly and is supplied with a voltage for development. Inside the sleeve 30, a magnet 30a is formed to assist the formation and charging of the thin toner layer.

The toner image formed on the photosensitive drum 3 by the developing means 104 position-determined with respect to the photosensitive drum 3 is transferred to a recording medium such as paper (not shown) which is moved below the photosensitive drum 3. Before the use of the process cartridge which is mounted to the apparatus main assembly in use, however, the photosensitive drum 3 is covered with a protective cover 50 attached to the housing 50 so as to allow opening and closing thereof for the purpose of preventing attachment of dirt, etc., and deterioration by exposure to external light of the photosensitive drum caused when the photosensitive drum 3 is exposed to the atmosphere.

The protective cover 50d is attached so as to be openable in the direction of an arrow B in FIG. 14 and is urged to be closed by a spring, etc. (not shown). When the process cartridge 50 is taken out of the apparatus main assembly, the protective cover 50d is in the closed state as shown in FIG. 14. When the process cartridge 50 is mounted to the apparatus main assembly, the protective cover 50 is moved in the arrow B direction to be opened by a mechanism (not shown), so that the photosensitive drum 3 confronts a transfer roller (not shown) on which paper is moved in image formation.

The exposure section 50b is also equipped with a protective cover (not shown) which is opened when the cartridge is mounted to the apparatus main assembly.

The cleaning means 106 is disposed to remove residual toner on the photosensitive drum 3 remaining after transfer of the toner image to the recording medium (paper). The cleaning means 106 includes a toner vessel 106a for receiving the residual toner, an elastic blade 106b and a scooping sheet 106c. Upon rotation of the photosensitive drum 3, the residual toner remaining on the photosensitive drum 3 is scraped by the blade 106b and guided by the scooping sheet 106c into the waste toner vessel 106a.

The process cartridge integrally includes a charging means, a developing means and/or a cleaning means together with an electrophotographic photosensitive member and is detachably mountable to an apparatus main assembly. It is preferred that at last the developing means and the electrophotographic photosensitive member are integrated to provide a cartridge.

In the above-described embodiments, the image-bearing member may have an image-bearing layer which may comprise an electrophotographic photosensitive material such as an organic photoconductor or amorphous silicon photoconductor, or may simply be an insulating layer. Such an image-bearing layer may preferably be formed on a cylinder except for a portion thereof bent and cut for fastening.

The above-described embodiments can be applied separately or in combination. The resultant cylindrical structure may for example be a photosensitive drum, a conveying roller, a fixing roller or a developing sleeve. These cylindrical structures may be directly assembled to form an image forming apparatus, or some of them may be integrated to form a cartridge which is detachably mountable to an apparatus main assembly.

As described hereinabove, according to the present invention, there are provided a method of fastening an engaging member to an end of a cylinder to provide a sufficient engaging force, a cylindrical structure thus obtained, a process cartridge and an image forming apparatus including such a cylindrical structure, further, by combining the inner surface-processing for socket joint, a further accurate engagement is ensured.

What is claimed:

1. A method of fastening an engaging member to an open end of a cylinder, said method comprising the steps of:

processing an inner surface of the open end of the cylinder to provide the cylinder with a reduced thickness;

providing an engaging member having a plurality of discrete recesses formed circumferentially around a periphery of the engaging member;

fitting the engaging member into the processed open end of the cylinder; and bending and cutting the processed open end of the cylinder, at positions spaced circumferentially around the open end of the cylinder, such that a plurality of parts projects into the plurality of discrete recesses of the engaging member, thereby restricting relative movement between the cylinder and the engaging member in longitudinal and rotational directions, wherein the engaging member is press-fit into the cylinder.

2. A method according to claim 1, wherein the inner surface of the cylinder is processed by at least one of cutting, abrading and grinding so as to provide an improved engagement accuracy between the cylinder and the engaging member.

3. A method according to claim 1, wherein the cylinder is bent and cut at circumferentially mutually opposite portions of an end brim of the cylinder.

4. A method according to claim 1, wherein the cylinder is bent and cut substantially simultaneously.

5. A method according to claim 1, wherein the cylinder is first bent and then cut on further bending.

6. A method according to claim 1, wherein the engaging member is a plastic flange, the plastic flange being fastened to the cylinder, the cylinder containing a magnet therein to provide a developing sleeve.

7. A method according to claim 1, wherein the cylinder has a thickness in the range of 0.3–1.5 mm in the vicinity of the plurality of parts.

8. A method according to claim 1, wherein the cylinder is cut in a length of at least 0.2 mm.

9. A method of fastening an engaging member to an open end of a cylinder, said method comprising the steps of:

processing an inner surface of the open end of the cylinder to provide the cylinder with a reduced thickness;

providing an engaging member having a plurality of discrete recesses formed circumferentially around a periphery of the engaging member;

fitting the engaging member into the processed open end of the cylinder; and bending and cutting the processed open end of the cylinder, at positions spaced circumferentially around the open end of the cylinder, such that a plurality of parts projects into the plurality of discrete recesses of the engaging member, thereby restricting relative movement between the cylinder and the engaging member in longitudinal and rotational directions, wherein the engaging member is press-fit into the cylinder with a press fit margin of 5–180 µm.

10. A method according to claim 1, wherein the cylinder comprises aluminum.

11. A method according to claim 1, wherein the engaging member comprises an insulating flange.

12. A method according to claim 1, wherein the engaging member comprises a gear.

13. A method according to claim 1, wherein the cylinder has a surface comprising a photosensitive material, and wherein the engaging member is a gear, the gear being fastened to an end of the cylinder to provide a photosensitive drum.

14. A method according to claim 13, wherein the gear is a helical gear.

15. A method according to claim 1, wherein the engaging member is a plastic flange, the plastic flange being fastened to the cylinder to provide a developing sleeve.

16. A method according to claim 9, wherein the engaging member is a plastic flange, the plastic flange being fastened to the cylinder, the cylinder containing a magnet therein to provide a developing sleeve.

17. A method according to claim 9, wherein the inner surface of the cylinder is processed by at least one of cutting, abrading and grinding so as to provide an improved engagement accuracy between the cylinder and the engaging member.

18. A method according to claim 9, wherein the cylinder is bent and cut at circumferentially mutually opposite portions of an end brim of the cylinder.

19. A method according to claim 9, wherein the cylinder is bent and cut substantially simultaneously.

20. A method according to claim 9, wherein the cylinder is first bent and then cut on further bending.

21. A method according to claim 9, wherein the cylinder has a thickness in the range of 0.3–1.5 mm in the vicinity of the plurality of parts.

22. A method according to claim 9, wherein the cylinder is cut in a length of at least 0.2 mm.

23. A method according to claim 9, wherein the cylinder comprises aluminum.

24. A method according to claim 9, wherein the engaging member comprises an insulating flange.

25. A method according to claim 9, wherein the engaging member comprises a gear.

26. A method according to claim 9, wherein the cylinder has a surface comprising a photosensitive material, and wherein the engaging member is a gear, the gear being fastened to an end of the cylinder to provide a photosensitive drum.

27. A method according to claim 26, wherein the gear is a helical gear.

28. A method according to claim 9, wherein the engaging member is a plastic flange, the plastic flange being fastened to the cylinder to provide a developing sleeve.

29. A method of assembling a developing sleeve for use in an electrophotographic image forming apparatus, said method comprising the steps of:

providing a cylinder having a developer-carrying outer surface and an open end having an inner surface;

processing the inner surface of the cylinder to provide the cylinder with a reduced thickness;

providing a terminal engaging member including a head which has a plurality of discrete recesses formed circumferentially around a periphery of the head;

press-fitting the head of the terminal engaging member into the processed open end of the cylinder; and bending and cutting the processed open end of the cylinder such that a plurality of parts projects into the plurality of discrete recesses of the head, thereby restricting relative movement between the cylinder and the terminal engaging member in longitudinal and rotational directions.

30. A method according to claim 29, wherein the inner surface of the cylinder is processed by at least one of cutting, abrading and grinding so as to provide an improved engagement accuracy between the cylinder and the engaging member.

31. A method of assembling an electrophotographic photosensitive drum for use in an electrophotographic image forming apparatus, said method comprising the steps of:

providing a cylinder having an image-bearing outer surface and an open end having an inner surface;

processing the inner surface of the cylinder to provide the cylinder with a reduced thickness;

providing a terminal engaging member including a head which has a plurality of discrete recesses formed circumferentially around a periphery of the head;

press-fitting the head of the terminal engaging member into the processed open end of the cylinder; and bending and cutting the processed open end of the cylinder such that a plurality of parts projects into the plurality of discrete recesses of the head, thereby restricting relative movement between the cylinder and the terminal engaging member in longitudinal and rotational directions.

32. A method according to claim 29, wherein the cylinder is bent and cut at circumferentially mutually opposite portions of an end brim of the cylinder.

33. A method according to claim 29, wherein the cylinder is bent and cut substantially simultaneously.

34. A method according to claim 29, wherein the cylinder is first bent and then cut on further bending.

35. A method according to claim 29, wherein the cylinder has a thickness in the range of 0.3–1.5 mm in the vicinity of the plurality of parts.

36. A method according to claim 29, wherein the cylinder is cut in a length of at least 0.2 mm.

37. A method according to claim 29, wherein the engaging member is press-fit into the cylinder with a press-fit margin of 5–180 µm.

38. A method according to claim 29, wherein the cylinder comprises aluminum.

39. A method according to claim 29, wherein the engaging member comprises an insulating flange.

40. A method according to claim 29, wherein the engaging member is a plastic flange, the plastic flange being fastened to the cylinder to provide a developing sleeve.

41. A method according to claim 29, wherein the engaging member is a plastic flange, the plastic flange being fastened to the cylinder, the cylinder containing a magnet therein to provide a developing sleeve.

42. A method according to claim 31, wherein the engaging member comprises a gear.

43. A method according to claim 31, wherein the inner surface of the cylinder is processed by at least one of cutting, abrading and grinding so as to provide an improved engagement accuracy between the cylinder and the engaging member.

44. A method according to claim 31, wherein the cylinder is bent and cut at circumferentially mutually opposite portions of an end brim of the cylinder.

45. A method according to claim 31, wherein the cylinder is bent and cut substantially simultaneously.

46. A method according to claim 31, wherein the cylinder is first bent and then cut on further bending.

47. A method according to claim 31, wherein the cylinder has a thickness in the range of 0.3–1.5 mm in the vicinity of the plurality of parts.

48. A method according to claim 31, wherein the cylinder is cut in a length of at least 0.2 mm.

49. A method according to claim 31, wherein the engaging member is press-fit into the cylinder with a press-fit margin of 5–180 µm.

50. A method according to claim 31, wherein the cylinder comprises aluminum.

51. A method according to claim 31, wherein the cylinder has a surface comprising a photosensitive material, and wherein the engaging member is a gear, the gear being fastened to an end of the cylinder to provide a photosensitive drum.

52. A method according to claim 31, wherein the gear is a helical gear.

* * * * *

UNITED STATES PATENT AND TRADEMARK OFFICE
CERTIFICATE OF CORRECTION

PATENT NO. : 5,675,893
DATED : October 14, 1997
INVENTOR(S) : YUSUKE YAMADA, ET AL.

It is certified that error appears in the above-identified patent and that said Letters Patent is hereby corrected as shown below:

COLUMN 1:

Line 23, "the present" should read --that the present--.
    Line 24, "of apparatus" should read --of an apparatus--.
    Line 60, "case" should read --the case--.

COLUMN 2:

Line 11, "such" should read --such a--.
    Line 22, "Very" should read --A very--.
    Line 28, "in respects of cost, management end productivity." should read --with respect to cost management and productivity.--.

COLUMN 5:

Line 3, "at a time" should read --at one time--.
    Line 11, "in" should read --in an--.
    Line 45, "invention" should read --invention.--.

COLUMN 6:

Line 4, "and" should read --(and--.
    Line 9, "Sear" should read --gear--.
    Line 23, "brim" should read --brim.--.
    Line 29, "1aof" should read --1a of--.
    Line 52, "Corresponding" should read --corresponding--.

COLUMN 7:

Line 5, "at" should read --it--.

UNITED STATES PATENT AND TRADEMARK OFFICE
CERTIFICATE OF CORRECTION

PATENT NO. : 5,675,893
DATED : October 14, 1997
INVENTOR(S) : YUSUKE YAMADA, ET AL.

It is certified that error appears in the above-identified patent and that said Letters Patent is hereby corrected as shown below:

COLUMN 8:

Line 8, "atoner" should read --a toner--.

COLUMN 11:

Line 52, "as" should read --as to--.
    Line 60, "cause" should read --causes--.

COLUMN 12:

Line 21, "reelects of" should read --respect to--.

COLUMN 13:

Line 15, "been practiced" should read --been a practice--.
    Line 36, "toughening" should read --roughening--.
    Line 51, "characteristic," should read --characteristics,--.

COLUMN 14:

Line 5, "To and" should read --To an--.
    Line 13, "con, our," should read --contour,--.
    Line 48, "be" should read --be a--.

UNITED STATES PATENT AND TRADEMARK OFFICE
CERTIFICATE OF CORRECTION

PATENT NO. : 5,675,893  
DATED : October 14, 1997  
INVENTOR(S) : YUSUKE YAMADA, ET AL.

It is certified that error appears in the above-identified patent and that said Letters Patent is hereby corrected as shown below:

COLUMN 15:

Line 2, "AS" should read --As--.  
    Line 42, "sires" should read --sizes--.  
    Line 44, "In" should read --in--.  
    Line 55, "the of" should read --the tip shape of--.  
    Line 59, "with" should read --width--.

COLUMN 16:

Line 37, "recess" should read --recesses--.

COLUMN 17:

Table 2,  
        Line 44, "curring" should read --cutting--.  
        Line 47, "curring" should read --cutting--.  
        Line 50, "curring" should read --cutting--.  
        Line 53, "curring" should read --cutting--.  
        Line 56, "curring" should read --cutting--.

COLUMN 18:

Line 7, "rest" should read --test--.

COLUMN 19:

Line 41, "which" should read --to which--.

UNITED STATES PATENT AND TRADEMARK OFFICE
CERTIFICATE OF CORRECTION

PATENT NO. : 5,675,893
DATED : October 14, 1997
INVENTOR(S) : YUSUKE YAMADA, ET AL.

It is certified that error appears in the above-identified patent and that said Letters Patent is hereby corrected as shown below:

COLUMN 20:

Line 44, "image," should read --image, and--.

COLUMN 21:

Line 48, "are" should read --is--.
    Line 52, "further," should read --Further,--.

Signed and Sealed this

Twenty-sixth Day of May, 1998

Attest:

BRUCE LEHMAN

Attesting Officer      Commissioner of Patents and Trademarks